US012698725B2

(12) United States Patent
Yamarthi et al.

(10) Patent No.: US 12,698,725 B2
(45) Date of Patent: Aug. 4, 2026

(54) AIR TURBINE STARTER

(71) Applicant: Unison Industries, LLC, Jacksonville, FL (US)

(72) Inventors: David Raju Yamarthi, Bengaluru (IN); Dattu GV Jonnalagadda, Bengaluru (IN); Sharad Pundlik Patil, Bengaluru (IN); Amit Arvind Kurvinkop, Bengaluru (IN); Parmeet Singh Chhabra, Bengaluru (IN); Shiloh Montegomery Meyers, Mimisburg, OH (US)

(73) Assignee: Unison Industries, LLC, Jacksonville, FL (US)

( * ) Notice: Subject to any disclaimer, the term of this patent is extended or adjusted under 35 U.S.C. 154(b) by 1 day.

(21) Appl. No.: 18/613,422

(22) Filed: Mar. 22, 2024

(65) Prior Publication Data

US 2025/0250908 A1 Aug. 7, 2025

(30) Foreign Application Priority Data

Jan. 4, 2024 (IN) .............................. 202411000681

(51) Int. Cl.
 F01D 25/00 (2006.01)
 F02C 7/277 (2006.01)
(52) U.S. Cl.
 CPC ............ F01D 25/005 (2013.01); F02C 7/277 (2013.01); F05D 2300/121 (2013.01);
 (Continued)

(58) Field of Classification Search
 CPC .......... F01D 25/005; F01D 5/18; F01D 5/288; F02C 7/26; F02C 7/268; F02C 7/27;
 (Continued)

(56) References Cited

U.S. PATENT DOCUMENTS

| | | |
|---|---|---|
| 4,196,061 A | 4/1980 | Satee |
| 8,105,018 B2 | 1/2012 | Gockel et al. |

(Continued)

FOREIGN PATENT DOCUMENTS

CN 112576378 B 3/2023

OTHER PUBLICATIONS

'Overview of Materials for Aluminum Alloy'. Matweb. [online]. 2021, [retrieved on Jul. 2, 2025]. Retrieved from the Internet: <URL: https://www.matweb.com/search/datasheet.aspx?MatGUID= ab8aeb2d293041c4a844e397b5cfbd4e> (Year: 2021).*

(Continued)

*Primary Examiner* — Elton K Wong
(74) *Attorney, Agent, or Firm* — McGarry Bair PC

(57) ABSTRACT

An air turbine starter having a housing that includes an inlet and an outlet to define an air flow path from the inlet to the outlet. A stator includes a plurality of circumferentially spaced vanes extending into the air flow path and defined a stator core. A coating surrounds one or more portions of the housing, defining the housing core, or the stator, defining the stator core. The housing core or the stator core includes a first material having a first hardness and the coating comprises a second material having a second hardness.

18 Claims, 6 Drawing Sheets

(52) U.S. Cl.
CPC .. *F05D 2300/17* (2013.01); *F05D 2300/5024* (2013.01); *F05D 2300/506* (2013.01); *F05D 2300/611* (2013.01)

(58) Field of Classification Search
CPC .......... F02C 7/272; F02C 7/275; F02C 7/277; F05D 2300/121; F05D 2300/17; F05D 2300/5024; F05D 2300/506; F05D 2300/611; F05D 2230/30; F05D 2230/90
See application file for complete search history.

(56) References Cited

U.S. PATENT DOCUMENTS

| | | | |
|---|---|---|---|
| 8,414,711 B2 | 4/2013 | Uchida et al. | |
| 10,081,877 B2 | 9/2018 | Richter et al. | |
| 10,294,573 B2 | 5/2019 | Parkos, Jr et al. | |
| 10,309,237 B2 | 6/2019 | Norton | |
| 10,900,136 B2 * | 1/2021 | Li | B29C 64/153 |
| 10,975,486 B2 | 4/2021 | Millward | |

| | | | |
|---|---|---|---|
| 2011/0211965 A1 * | 9/2011 | Deal | F02K 3/04 |
| | | | 416/223 R |
| 2013/0292594 A1 | 11/2013 | Rankin et al. | |
| 2016/0047261 A1 * | 2/2016 | Vest | F01D 25/28 |
| | | | 264/129 |
| 2016/0145755 A1 | 5/2016 | Cook | |
| 2016/0339661 A1 | 11/2016 | Jones et al. | |
| 2018/0312976 A1 * | 11/2018 | Wiley | C23C 28/02 |
| 2020/0190650 A1 * | 6/2020 | Tajiri | C22F 1/10 |
| 2022/0065169 A1 * | 3/2022 | Reddy Kollam | F02C 7/277 |

OTHER PUBLICATIONS

Overview of Materials for Nickel Alloy. Matweb. [online]. 2021, [retrieved on Jul. 2, 2025]. Retrieved from the Internet: <URL:https://www.matweb.com/search/datasheet.aspx?matguid=8808b026f7c14d2f8d61f2d476aaeb26> (Year: 2021).*

'List of Thermal Conductivities'. Wikipedia. [online]. 2020, [retrieved on Jul. 2, 2025]. Retrieved from the Internet: <URL:https://web.archive.org/web/20200416182651/https://en.wikipedia.org/wiki/List_of_thermal_conductivities>> (Year: 2020).*

* cited by examiner

AIR TURBINE STARTER

CROSS-REFERENCE TO RELATED APPLICATION(S)

This application claims priority to Indian Provisional Patent Application No. IN202411000681, filed Jan. 4, 2024, which is incorporated herein by reference in its entirety.

TECHNICAL FIELD

The disclosure generally relates to an air turbine starter, more specifically, a coating for stationary components of the air turbine starter.

BACKGROUND

A turbine engine, for example a gas turbine engine, is typically started via an air turbine starter (ATS). The ATS is often mounted near the turbine engine and the ATS can be coupled to a high-pressure fluid source, such as compressed air, which impinges upon a turbine rotor in the ATS causing it to rotate at a relatively high rate of speed. The ATS includes an output shaft that is driven by the turbine rotor, typically through a reducing gear box, where the output shaft provides rotational energy to a rotatable element of the turbine engine (e.g., the crankshaft or the rotatable shaft) to begin rotating. The rotation by the ATS continues until the turbine engine attains a self-sustaining operating rotational speed.

BRIEF DESCRIPTION OF THE DRAWINGS

A full and enabling disclosure of the present subject matter, including the best mode thereof, directed to one of ordinary skill in the art, is set forth in the specification, which makes reference to the appended FIGS., in which.

DETAILED DESCRIPTION

Figure 1:
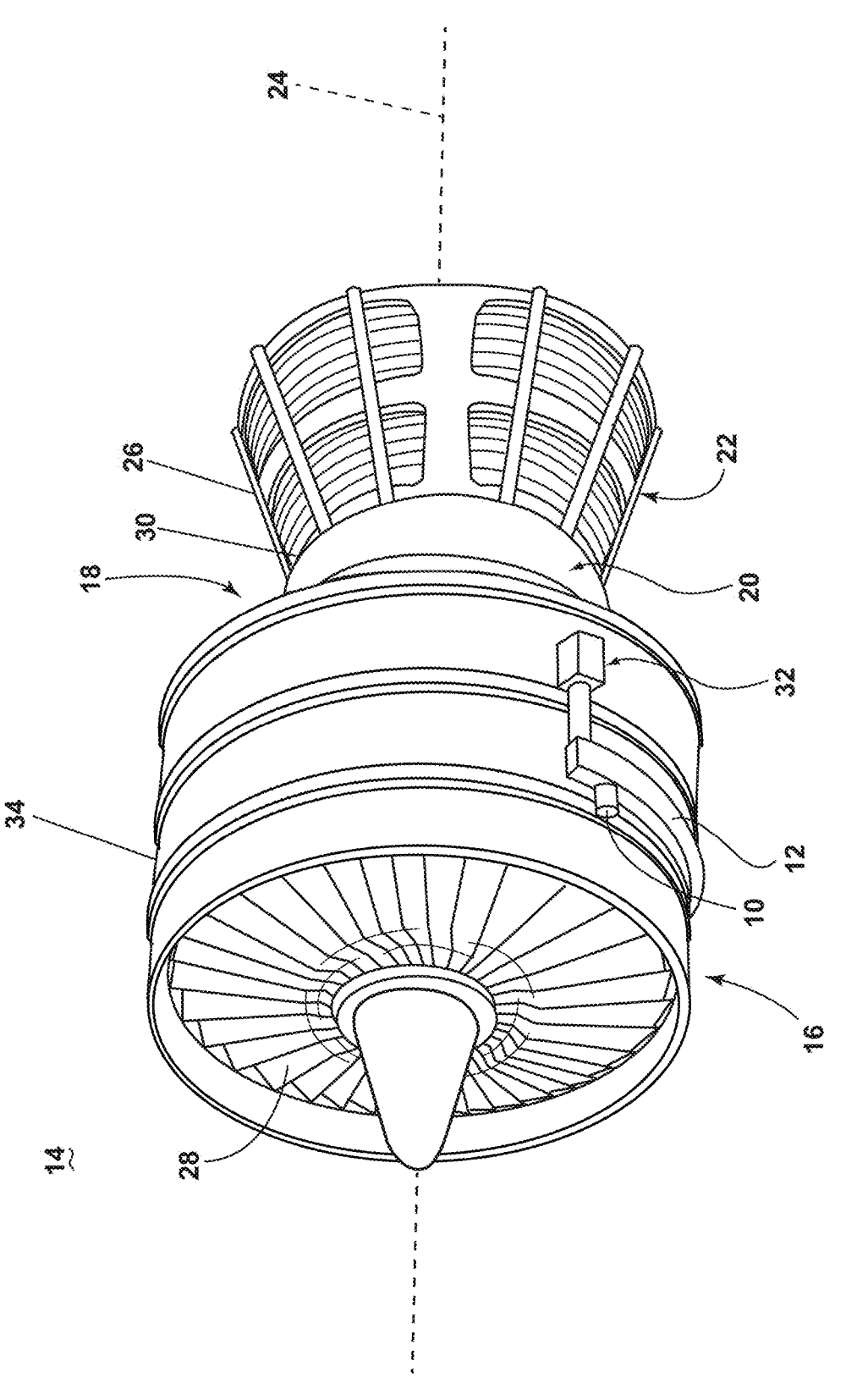
FIG. 1 is a schematic illustration of a turbine engine with an air turbine starter, in accordance with various aspects described herein.

Aspects of the present disclosure are directed to an air turbine starter (ATS) where at least a portion of stationary components of the ATS includes a coating. More specifically, and by way of example, at least a portion of an inlet housing and/or a stator include the coating. The coating is a material that is harder than the material it is applied to. That is, the coated portions of the inlet housing and/or the stator are made of a material having a first hardness, while the coating is made of a material having a second hardness, which is greater than the first hardness.

Applying a harder material to a softer material provides a weight advantage, as the softer material is often lighter than traditional materials. For example, a component made from aluminum or magnesium alloys and coated with nickel cobalt phosphate is lighter than the same component made from steel, yet has similar or better strength or impact resistance. Optionally, the component, when formed from aluminum or magnesium alloys with a coating of nickel cobalt phosphate can have a smaller total volume than the same component made from steel, providing a space savings. Thus, all other things being equal, a lighter component of similar or better strength and/or impact resistance is achieved.

The coating provides structural rigidity. The coating can also provide some thermal resistance. A thermal barrier coating, having a lower thermal conductivity than the coating, can also be applied to portions of the inlet housing and/or the stator before or after the coating.

Additionally, aspects of the present disclosure are directed to electroforming at least a portion of the inlet housing or the stator by surrounding a sacrificial mandrel with the coating, then removing the sacrificial mandrel. The hollow portions of the inlet housing or the stator provide a weight advantage over solid components.

While the examples described are directed to application of a turbine engine and an ATS, the disclosure can be applied to any implementation of a driving mechanism that generates rotational motion at a driving output and provides the rotational motion to another piece of rotating equipment. For purposes of illustration, the present disclosure will be described with respect to an ATS for an aircraft turbine engine, however, the ATS can have various applications including starting any gas turbine engine.

As used herein, the term "thermal barrier coating" refers to thermally insulating material applied to an object that operates at elevated temperatures or in an environment with elevated temperatures. That is, a thermal barrier coating (TBC) can be a ceramic material or any material with a low thermal conductivity. For example, the low thermal conductivity material(s) have a thermal conductivity at or below 1 Watt per meter-Kelvin (W/mK)).

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms such as "first", "second", "third", etc. may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "radial" or "radially" refer to a direction extending towards or away from a common center. For example, in the overall context of a turbine engine, radial refers to a direction along a ray extending between a center longitudinal axis of the turbine engine and an outer engine circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, fastened, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

As used herein, the term "additive manufacturing" generally refers to manufacturing processes wherein successive layers of material(s) are provided on each other to "build-up," layer-by-layer, a three-dimensional component. The successive layers generally fuse together to form a monolithic unitary component, which can have a variety of integral sub-components. Monolithic, as used herein, refers to a unitary structure lacking interfaces or joints by virtue of the materials of each layer fusing to or melting with the materials of adjacent layers such that the individual layers lose their identity in the final unitary structure.

Suitable additive manufacturing techniques in accordance with the present disclosure include, for example, Directed Energy Deposition (DED), Fused Deposition Modeling (FDM), Selective Laser Sintering (SLS), 3D printing such as by inkjets and laserjets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

In addition to using a direct metal laser sintering (DMLS) or direct metal laser melting (DMLM) process where an energy source is used to selectively sinter or melt portions of a layer of powder, it should be appreciated that according to alternative aspects of the present disclosure, the additive manufacturing process can be a "binder jetting" process. In this regard, binder jetting involves successively depositing layers of additive powder in a similar manner as described above. However, instead of using an energy source to generate an energy beam to selectively melt or fuse the additive powders, binder jetting involves selectively depositing a liquid binding agent onto each layer of powder. The liquid binding agent can be, for example, a photo-curable polymer or another liquid bonding agent. Other suitable additive manufacturing methods and variants are intended to be within the scope of the present subject matter.

Referring to FIG. 1, an air turbine starter motor or air turbine starter (ATS) 10 is coupled to an accessory gear box (AGB) 12, also known as a transmission housing, and together are schematically illustrated as being mounted to a turbine engine 14, such as a gas turbine engine. This assembly is commonly referred to as an Integrated Starter/Generator Gearbox (ISGB). The turbine engine 14 includes a fan section 16, a compressor section 18, a combustion section 20, and a turbine section 22 in serial flow arrangement, and defining an engine centerline 24. A core, having one or more core casings 26, can be defined by the compressor section 18, the combustion section 20, and the turbine section 22.

A fan 28 in the fan section 16 supplies air to the compression section 18. The fan section 16, with the fan 28, and the compression section 18 is collectively known as the 'cold section' of the turbine engine 14. The cold section is positioned upstream of the combustion section 20 of the turbine engine 14. The compression section 18 provides a combustion chamber 30 of the combustion section 20 with high-pressure air. In the combustion chamber 30, the high-pressure air is mixed with fuel and combusted. The hot and pressurized combusted gas passes through the turbine section 22 having a high-pressure turbine region and a low-pressure turbine region before exhausting from the turbine engine 14. As the pressurized gases pass through a high-pressure turbine of the high-pressure turbine region and a low-pressure turbine of the low-pressure turbine region, the turbines extract kinetic energy from the flow of the gases passing through the turbine engine 14.

The AGB 12 is coupled to the turbine engine 14 by way of a mechanical power take-off 32. By way of non-limiting example, the AGB 12 can be coupled to the turbine section 22. The mechanical power take-off 32 contains multiple gears and means for mechanical coupling of the AGB 12 to the turbine engine 14. Under normal operating conditions, the mechanical power take-off 32 translates power from the turbine engine 14 to the AGB 12 to power accessories of the aircraft, such as, but not limited to fuel pumps, electrical systems, and cabin environment controls. The ATS 10 can be located radially outside of a fan casing 34. That is, the ATS 10 can be located radially outside of the air intake region containing the fan 28. Alternatively, it is contemplated that in a differing and non-limiting example, the ATS 10 can be located outside of the core casing 26 near the compression section 18, where the ATS 10 can be coupled to a transfer gear box or an accessory gear box. Further, any location for the ATS 10 is contemplated where the ATS 10 can be coupled to the turbine engine 14.

Figure 2:
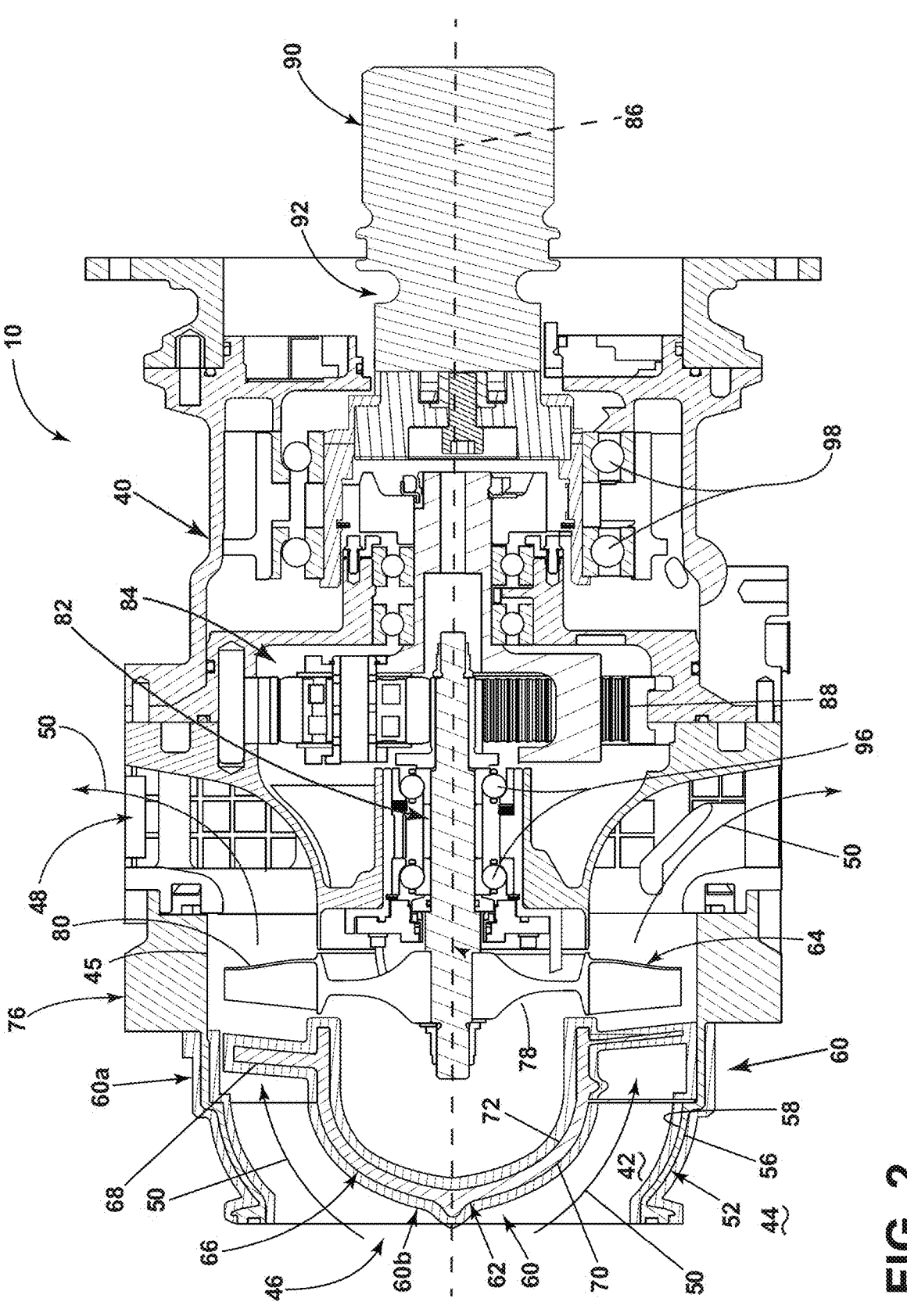
FIG. 2 is a schematic cross-sectional view of a portion of the air turbine starter of FIG. 1, in accordance with various aspects described herein.

FIG. 2 is a schematic cross-section of an exemplary ATS 10 that can, for example, be included in FIG. 1. Generally, the ATS 10 includes a housing 40 defining an interior 42 and an exterior 44 of the housing 40. The housing 40 having an inlet 46 and an outlet 48 to define an air flow path 50 from the inlet 46 to the outlet 48. The air flow path 50 through the interior 42 is illustrated schematically with arrows. The air flow path 50 extends between the inlet 46 and the outlet 48 for communicating a flow of fluid, including, but not limited to gas, compressed air, or the like, therethrough. In one non-limiting example, the fluid is air, such as pressurized air, that is supplied from a pressurized air source, including but not limited to, a ground-operating air cart, an auxiliary power unit, or a cross-bleed start from an engine already operating.

The housing 40 can be formed in any suitable manner including, but not limited to, that it can be made up of two or more parts that are joined or otherwise coupled together or can be integrally formed as a single piece. An inlet housing 52 can be a portion of the housing 40 that defines the inlet 46. The inlet housing 52 includes an exterior surface 56 and an interior surface 58. At least a portion of the interior surface 58 of the inlet housing 52 defines a portion of the air flow path 50.

In the illustrated example, the ATS 10 includes a coating 60 that surrounds at least a portion of the inlet housing 52. The coating 60 can be a housing coating 60a, where the housing coating 60a is in contact with at least a portion of the interior surface 58 and/or the exterior surface 56. The proportions of the inlet housing 52 and the housing coating 60a have been exaggerated for clarity. Most notably, the thickness of the housing coating 60a is exaggerated to be similar to the thickness of the inlet housing 52, when in actually, the thickness of the housing coating 60a is proportionally much smaller.

The ATS 10 includes a stator 62 in the air flow path 50. The stator 62 can couple to or be formed as part of the housing 40 or the inlet housing 52, where the stator 62 is rotationally stationary relative to the housing 40. The stator 62 includes a nose 66 and a plurality of circumferentially spaced vanes 68 that extend from the nose 66 and into the air flow path 50.

The plurality of circumferentially spaced vanes 68 direct the air flow path 50 as is it pass from the inlet 46, through the stator 62 and to a rotatable turbine member 64. That is, the air flow path 50 passes through gaps or permeable portions formed between adjacent vanes of the plurality of circumferentially spaced vanes 68, guided by the shape of the plurality of circumferentially spaced vanes 68.

The stator 62 includes an axially forward surface 70 and an axially aft surface 72. The coating 60 can surround the stator 62 and be in contact with at least a portion of the forward surface 70 and the aft surface 72. The coating 60 can be a stator coating 60b. Similar to the housing coating 60a, the proportions of the stator coating 60b and the stator 62 have been exaggerated for clarity. Most notably, the thickness of the stator coating 60b is exaggerated to be similar to the thickness of the stator 62, when in actually, the thickness of the stator coating 60b is proportionally much smaller.

The turbine member 64 is located within the interior 42 of the housing 40, aft or downstream of the stator 62. The housing 40 can include a turbine housing 76 that can be formed with or coupled to the inlet housing 52. At least a portion of the turbine member 64 is disposed within the air flow path 50 for rotatably extracting mechanical power from the flow of gas along the air flow path 50. The turbine member 64 includes a rotor 78 portion and a plurality of circumferentially spaced blades 80 downstream of the plurality of circumferentially spaced vanes 68. A containment assembly 45 is disposed in the turbine housing 76, surrounding at least a portion of the turbine member 64.

The ATS 10 includes a drive shaft 82 that is coupled to the rotating turbine member 64 so that the drive shaft 82 can provide a rotational output. The ATS 10 includes an output gear assembly 84 coupled to the drive shaft 82 to allow for the transfer of mechanical power from the turbine member 64 to the output gear assembly 84 via the rotational output of the drive shaft 82. The turbine member 64, the drive shaft 82, a portion of the output gear assembly 84, or any combination thereof can rotate about an axis of rotation 86.

The output gear assembly 84 can include a gear train 88. An output shaft 90 can be operably coupled to the turbine member 64 via the output gear assembly 84 including the gear train 88 and a decoupler 92.

The output shaft 90 is operably coupled to the turbine engine 14 (FIG. 1) such that the output shaft 90 can rotate a portion of the turbine engine 14. It is contemplated that the output shaft 90 is operably coupled to one or more portions of the compression section 18 (FIG. 1) or the turbine section 22 (FIG. 1). That is, the output shaft 90 can rotate one or more portions of the compression section 18 or the turbine section 22.

The ATS 10 includes a first bearing assembly 96 that rotatably supports the drive shaft 82. Optionally, the ATS 10 can include a second bearing assembly 98 to rotatably support the drive shaft 82, the output shaft 90, or both the drive shaft 82 and the output shaft 90. The second bearing assembly 98 can be located aft of the first bearing assembly 96. By way of non-limiting example, the second bearing assembly 98 can be provided adjacent the gear train 88 or the output gear assembly 84.

Figure 3:
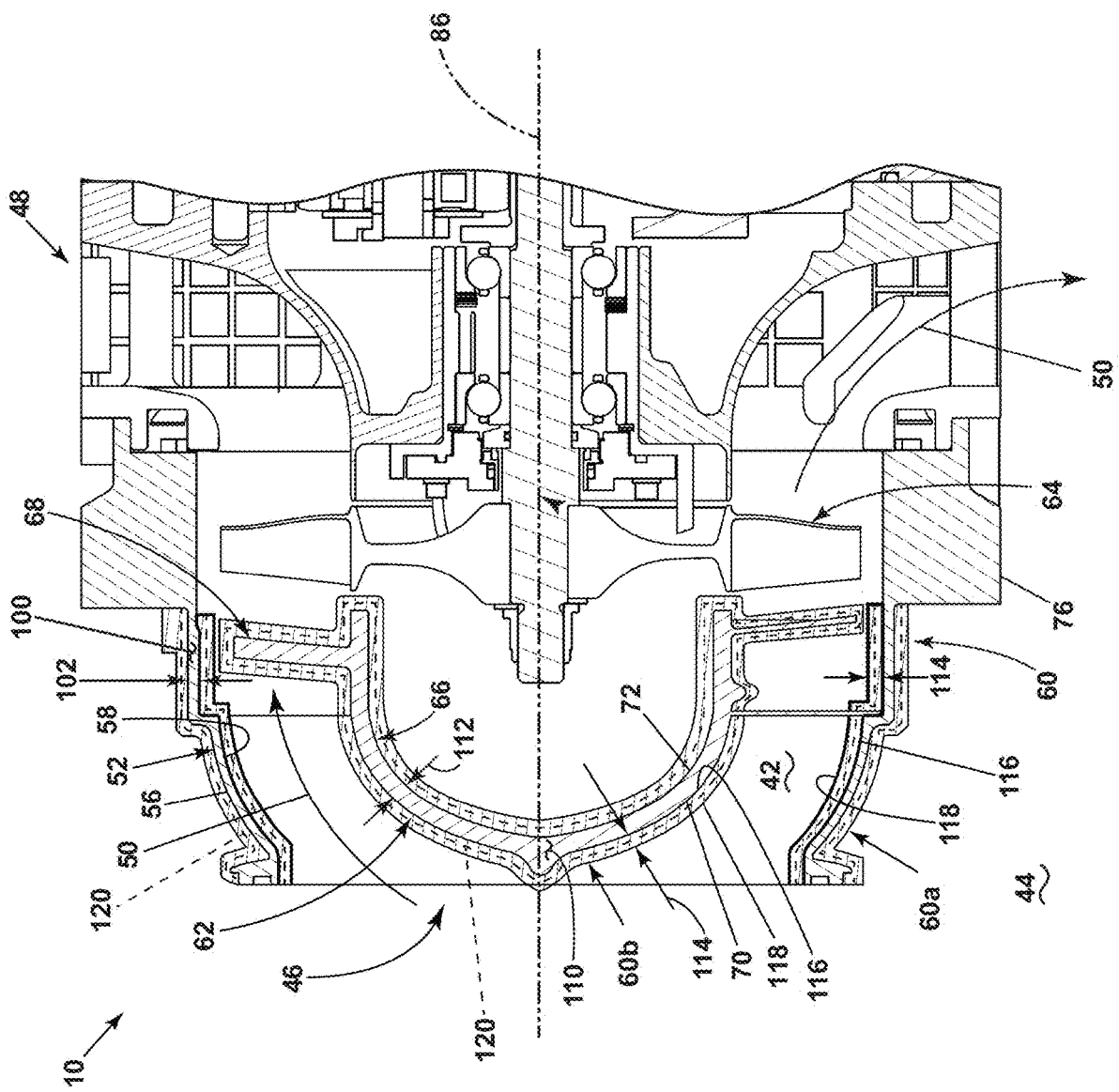
FIG. 3 is an enlarged portion of the schematic cross-sectional view of FIG. 2, in accordance with various aspects described herein.

FIG. 3 is an enlarged schematic cross-section of a portion of the ATS 10 of FIG. 2 further illustrating the coating 60. A housing core 100 is defined as the portion of the inlet housing 52 surrounded by the housing coating 60a. The housing coating 60a can be a housing shell that surrounds, encases, or otherwise encompasses all or part of the inlet housing 52. A housing thickness 102 can be measured from the exterior surface 56 to the interior surface 58. The housing thickness 102 can be in a range from 0.02 millimeters to 2.86 millimeters (approximately 0.001 inches to 0.09 inches). For example, the housing thickness 102 of the housing core 100 can be in a range from 0.25 millimeters to 2.1 millimeters (approximately 0.01 inches to 0.08 inches). The housing thickness 102 can provide a weight savings while maintaining a predetermined structural size and/or shape.

While illustrated as thicker at the inlet 46 and generally uniform aft of the inlet 46, the housing thickness 102 can vary in an axial direction (Ad) along the axis of rotation 86 at any point.

A stator core 110 is defined as the portion of the stator 62 surrounded by the stator coating 60b. The stator coating 60b can be a stator shell that surrounds, encases, or otherwise encompasses all or part of the stator 62. A stator thickness 112 can be measured from the forward surface 70 to the aft surface 72 of the stator 62. The stator thickness 112 can be in a range from 0.02 millimeters to 2.86 millimeters (approximately 0.001 inches to 0.09 inches). For example, the stator thickness 112 of the stator core 110 can be in a range from 0.25 millimeters to 2.1 millimeters (approximately 0.01 inches to 0.08 inches). The stator thickness 112 can provide a weight savings while maintaining a predetermined structural size and/or shape.

The housing core 100, the stator core 110, or the housing core 100 and the stator core 110 include a first material having a first hardness. The first hardness, using Mohs hardness, is 4 or less. For example, the first hardness, using Mohs hardness, can be 3 or less.

The first hardness, when considering Brinell hardness, can be 500 megapascals or less. When considering the Rockwell Hardness (A scale 60 kg), the first hardness can be, for example, 82 or less. When considering the Rockwell Hardness (C scale 150 kg), the first hardness can be, for example, 61 or less. For example, the first hardness, when considering Brinell hardness, can be 400 megapascals or less. When considering the Rockwell Hardness (A scale 60 kg), the first hardness can be, for example, 72 or less. When considering the Rockwell Hardness (C scale 150 kg), the first hardness can be, for example, 43 or less.

The first material can include a metal. By way of non-limiting example, the metal included in the first material can be magnesium (i.e., magnesium alloys), aluminum (i.e., aluminum alloys), zinc (i.e., zinc alloys), or any combination therein. While described as including a metal, it is contemplated that the first material can be made of non-metal materials. By way of non-limiting example, the first material can include carbon or one or more polymers. It is further contemplated that the first material can be electrically conductive. That is, the first material can have a volume resistivity less than 1×104 ohms-centimeter.

The first material has a first thermal conductivity. The first thermal conductivity can be greater than 200 watts per meter-Kelvin.

Alternatively, in a different and non-limiting example, the first material can include at least one polymer coated in an electrically conductive material, such as, but not limited to, graphene.

The housing core 100 and the stator core 110 can be formed individually and coupled together. Alternatively, in a different and non-limiting example, it is contemplated that the housing core 100 and the stator core 110 can be unitarily formed, for example, by additive manufacturing. It is also contemplated that one or more portions of the turbine housing 76 can be coupled to or formed with one or more portions of the inlet housing 52 or the stator 62.

The coating 60 surrounds one or more portions of the housing core 100, the stator core 110, or both the housing core 100 and the stator core 110. The coating 60 includes a second material having a second hardness. The second hardness is greater than the first hardness.

The second material can include a metal having a Mohs hardness greater than 4. For example, the second material can include a metal having a Mohs hardness greater than 5.

The second hardness, when considering Brinell hardness, can be 300 megapascals or more. For example, the second hardness, when considering Brinell hardness, can be 350 megapascals or more. In another example, the second hardness, when considering Brinell hardness, can be 500 megapascals or more.

The second material can include a metal. By way of non-limiting example, the second material can include titanium, nickel, chromium, or any combination therein (e.g., nickel cobalt phosphate). While described as including a metal, it is contemplated that the second material can be made of non-metal materials. By way of non-limiting example, the second material can include ceramic. It is further contemplated that the second material can be electrically conductive. That is, the second material can have a volume resistivity less than 1×104 ohms-centimeter.

The second material has a second thermal conductivity. The second thermal conductivity can be less that the first thermal conductivity. The second thermal conductivity can be less than 200 watts per meter-Kelvin. For example, the second thermal conductivity can be in a range from 10 to 100 watts per meter-Kelvin. In another example, the second thermal conductivity can be in a range from 10 to 50 watts per meter-Kelvin.

The stator coating 60b can surround at least the plurality of circumferentially spaced vanes 68. The stator coating 60b can also surround one or more portions of the nose 66.

A coating thickness 114 of the coating 60 is measured from an inner coating surface 116 to an outer coating surface 118. The coating thickness 114 is in a range from 0.002 millimeters to 4.6 millimeters (approximately 0.0001 inches to 0.18 inches). For example, the coating thickness 114 is in a range from 0.002 millimeters to 3 millimeters (approximately 0.0001 inches to 0.12 inches).

The coating thickness 114 can be in a range of 0% to 400% of the housing thickness 102 or the stator thickness 112 measured at the same location as the coating thickness 114. For example, the coating thickness 114 can be in a range of 5% to 200% of the housing thickness 102 or the stator thickness 112 measured at the same location as the coating thickness 114. That is, the coating thickness 114 can be less than or equal to the housing thickness 102 or the stator thickness 112 and in a range from 5% to 100%. Alternatively, in a different and non-limiting example, the coating thickness 114 can be greater than the housing thickness 102 or the stator thickness 112 and in a range from greater than 100% to 200%.

Figure 5:
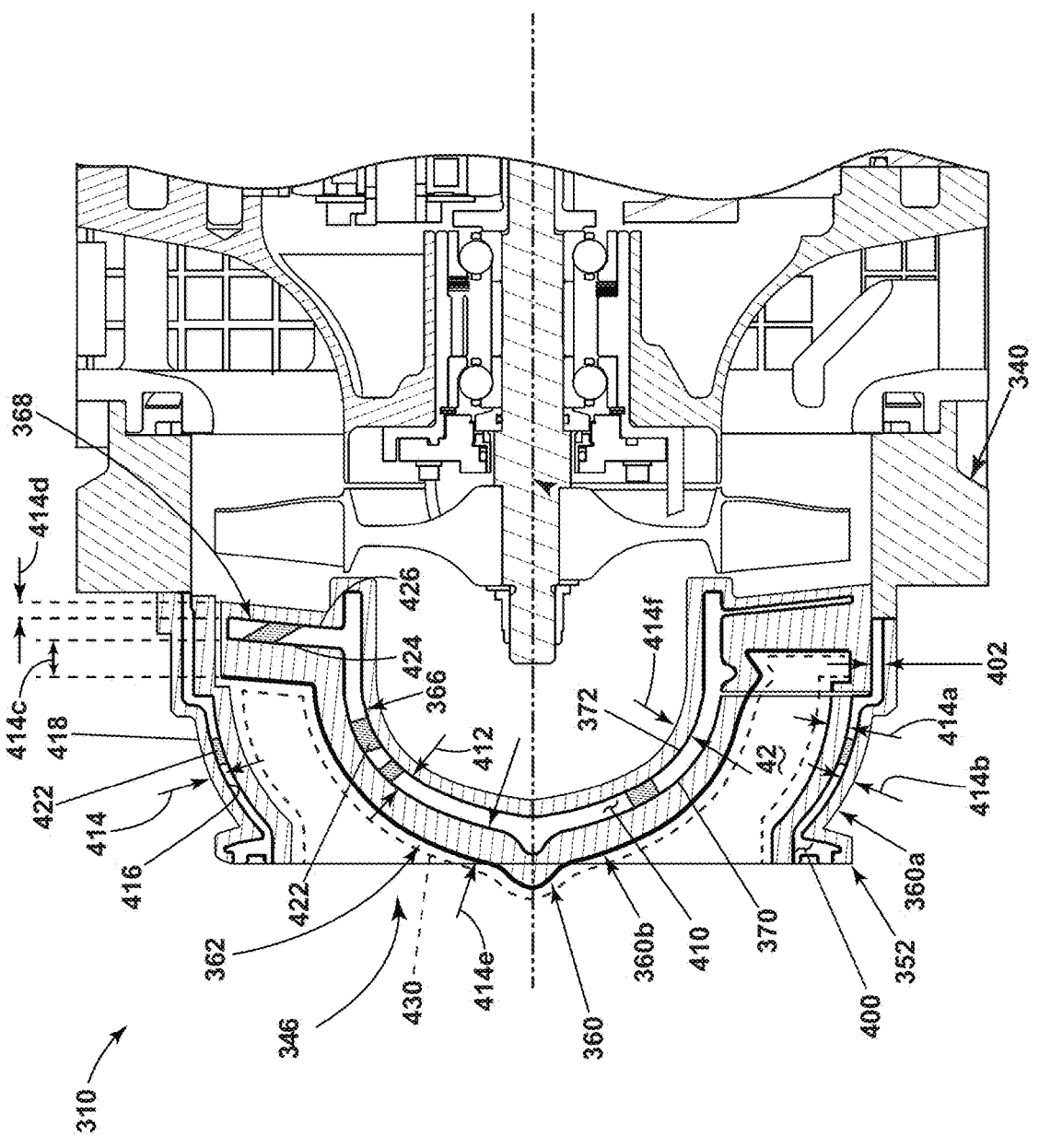
FIG. 5 is variation of the schematic cross-sectional view of FIG. 3, in accordance with various aspects described herein.

While illustrated as generally uniform, the coating thickness 114 can vary from one portion of the inlet housing 52 or the stator 62 to another (FIG. 5).

The coating 60 is illustrated, by way of example, as a single layer surrounding the housing core 100 and/or the stator core 110. However, it is contemplated that the coating 60 can be multiple layers or a plurality of layers. Each layer of the multiple layers can be made of the same material, different material, or the different proportions of the same material as another layer of the multiple layers. While contemplated as different materials, the hardness of each layer of the multiple layers is greater than the first hardness of the stator core 110 and/or the housing core 100. It is further contemplated that each layer of the coating 60 can increase in hardness as the layers are farther from the housing core and/or the stator core. It is yet further contemplated that each layer of the coating 60 can vary in thermal properties such as, but not limited to, conduction, radiation, or thermal resistivity.

It is contemplated that the stator core 110 and the housing core 100 can be formed from the same material or different materials. That is, optionally, the housing core 100 or the stator core 110 can include a different material or different proportions of the same materials as the first material. By way of non-limiting example, the stator 62, or stator core 110 can include a third material having a third hardness. The third hardness can be less than the second hardness of the coating 60. Further, it is contemplated that the third hardness can be greater than the first hardness of the housing 40. Alternatively, in a different and non-limiting example, the third hardness of the stator core 110 can be less than the first hardness of the housing core 100.

By way of non-limiting example, a thermal barrier coating (TBC) 120 is illustrated between the stator 62 and the stator coating 60b, however it is contemplated the TBC 120 can be located between the coating 60 and one or more portions of the stator core 110, the housing core 100, or the stator core 110 and the housing core 100.

Alternatively, in a different and non-limiting example, the TBC 120 can be located at the outer coating surface 118 of the coating 60. It is further contemplated that a TBC can be located between the coating 60 and one or more portions of the stator core 110 or the housing core 100, and another TBC located at the outer coating surface 118 of the coating 60.

The TBC 120 has a thermal conductivity of in a range from 5 watts per meter-Kelvin to 1 watt per meter-Kelvin when the TBC 120 is between, for example, 100° C. to 900° C. For example, the TBC 120 has a thermal conductivity of in a range from 2 watts per meter-Kelvin to 1.2 watt per meter-Kelvin when the TBC 120 is between, for example, 100° C. to 900° C.

The TBC 120 can include a fourth material having a fourth hardness. The fourth material can include, by way of non-limiting example, one or more of aluminum (i.e., YSZ, Mullite, Alunina), cerium (i.e., CeO2), or other oxides. That is the TBC 120 can have a hardness that is greater than one or more of the first material, the second material, or the third material. Alternatively, in a different and non-limiting example, the fourth hardness can be less than the second hardness. In still yet another non-limiting example, the first hardness can be less than the fourth hardness.

The TBC 120 can have a thickness between 80 micrometers to 4 millimeters. It is contemplated that the TBC 120 consist of layers. By way of non-limiting example, the TBC 120 can include a metallic bond coat, thermally-grown oxide (TGO), and ceramic topcoat.

Figure 4:
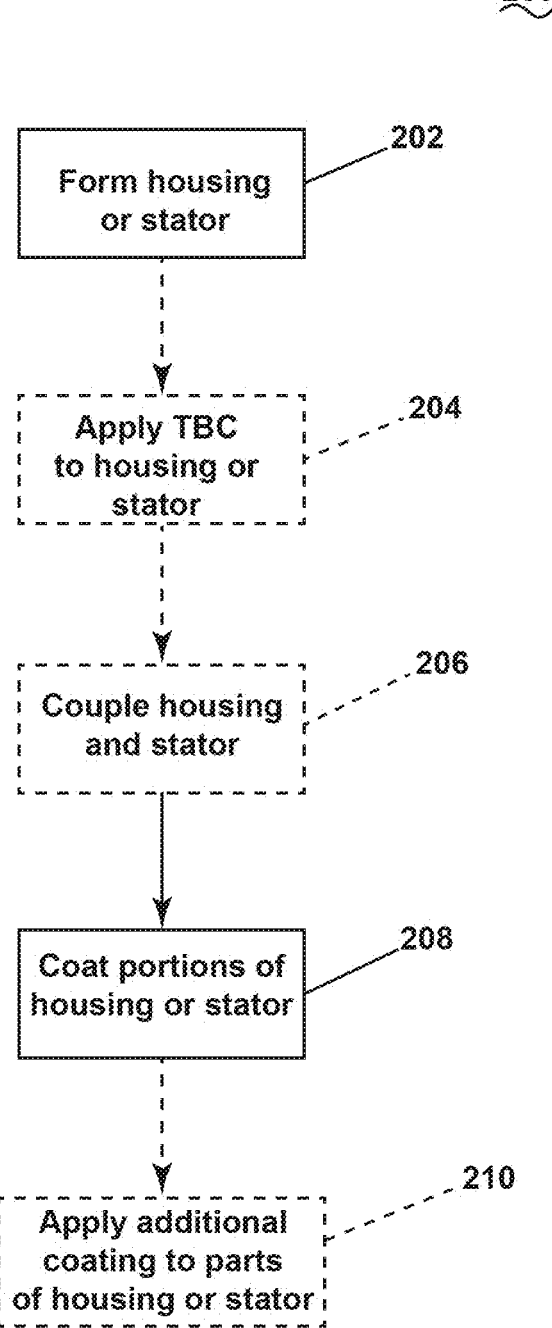
FIG. 4 is a flow chart illustrating a method of forming one or more portions of the air turbine starter of FIG. 3, in accordance with various aspects described herein.

FIG. 4 illustrates a method 200 of forming one or more portions of the ATS 10, wherein aspects of the ATS 10 are illustrated at least in FIG. 2 and FIG. 3. For example, the method 200 can be a method of forming one or more portions of the housing 40, the stator 62, or portions of the housing 40 and the stator 62. At 202 the housing 40 or the stator 62 are formed. For example, the housing core 100, the stator core 110, or the housing core 100 and the stator core 110 are formed. The housing core 100 and the stator core 110 can be unitarily form (i.e., additive manufacturing), or formed separately. That is, the housing core 100 or the stator core 110 can be formed using, by way of non-limiting example, a cast mold, application of layers (i.e., additive manufacturing), machined part, of any combination therein. The housing core 100 and the stator core 110 can be formed as a single piece or as two or more pieces, where any number of pieces are contemplated. The housing core 100 or the stator core 110 can include, by way of example, aluminum or magnesium.

Optionally, at 204, the TBC 120 can be applied to the housing core 100, the stator core 110, or the housing core 100 and the stator core 110.

Optionally, at 206, the stator 62 can be mounted to the housing 40. That is the inlet housing 52 or the housing core 100 is coupled to the stator 62 or the stator core 110. While illustrated as after 204, it is contemplated that portions of the housing 40 and the stator 62 can be coupled prior to the application of the TBC 120.

At 208, portions of the stator 62 and the housing 40 are surrounded by the coating 60. That is, the housing core 100, the stator core 110, or the housing core 100 and the stator core 110 receive the coating 60.

The coating 60 can be applied by electroforming. During electroforming, the coating 60 can be applied as a single layer or multiple layers. Alternatively, the coating can be applied or deposited by direct metal deposition, dip coatings, spray coating, or any known coating application process.

While described as including a metallic material such as, but not limited to titanium, nickel, chromium, or any combination of conductive metals, it is contemplated that the coating 60 can include a ceramic material.

While illustrated as after the optional TBC 120 at 204 and the optional coupling of one or more portions of the stator 62 and the housing 40, it is contemplated that the TBC 120 applied at 204 can be applied after the coating 60 applied at 208. It is further contemplated that the coupling at 206 can occur before or after applying the coating 60 at 208.

Optionally, at 210 additional layers of coating or additional components or parts can be applied to or coupled to the housing 40 or the stator 62. That is, by way of example, the inlet housing 52 can be coupled to the turbine housing 76. In other words, the ATS 10 can be fully assembled.

While illustrated as after applying the coating 60 at 208, assembly and/or additional layers of coating can be added before or after the applying the coating 60 at 208.

Optionally, at 212, one or more portions of the housing core 100 or the stator core 110 can be removed. That is, one or more portions of the housing core 100 or the stator core 110 can be leached or otherwise physically, or chemically removed from within the coating 60, as illustrated in FIG. 5.

FIG. 5 is a variation of the enlarged cross section of FIG. 3 illustrating an ATS 310. The ATS 310 is similar to the ATS 10, therefore, like parts will be identified with like numerals increased by three hundred (300), with it being understood that the description of the like parts of ATS 10 applies to the ATS 310, unless otherwise noted.

The ATS 310 includes a housing 340 having an inlet housing 352 that defines an inlet 346. The inlet housing 352 includes a hollow housing core 400 defined by a housing coating 360*a*. The housing core 100 (FIG. 3) can be a sacrificial mandrel, such that when it is removed, the hollow housing core 400 is formed. The housing coating 360*a* can be a shell that surrounds, encases, or otherwise encompasses the hollow housing core 400.

It is contemplated that the hollow housing core 400 includes ribs or support structures 422 that span at least a portion of the hollow housing core 400. That is, the support structures 422 extend across the hollow housing core 400 and couple to or are otherwise in contact with at least two locations of an inner coating surface 416. Any number of support structures 422 are contemplated. The shape, thickness, or density can vary from one support to another. It is contemplated that the support structures 422 can be hollow, woven, cast, or formed in any shape or material. The support structures 422 can be made of a non-leachable material and cast, printed, or otherwise included in the sacrificial mandrel. Alternatively, in a different and non-limiting example, the support structures 422 can be added after removal of the sacrificial mandrel.

A housing thickness 402 can be measured across the hollow housing core 400. The housing thickness 402 can be in a range from 0.02 millimeters to 2.86 millimeters (approximately 0.001 inches to 0.09 inches). For example, the housing thickness 402 of the hollow housing core 400 can be in a range from 0.25 millimeters to 2.1 millimeters (approximately 0.01 inches to 0.08 inches). The hollow housing core 400 provides a weight savings while the support structures 422 and/or the housing coating 360*a* maintain a predetermined structural size and/or shape.

A coating thickness 414 is measured from the inner coating surface 416 to an outer coating surface 418. The coating thickness 414 can be in a range of 0% to 600% of the housing thickness 402 measured at the same location as the coating thickness 414. For example, the coating thickness 414 can be in a range 10%-500% of the housing thickness 402 measured at the same location as the coating thickness 414. That is, the coating thickness 414 can be less than or equal to the housing thickness 402 and in a range from 10% to 100%. Alternatively, in a different and non-limiting example, the coating thickness 414 can be greater than the housing thickness 402 and in a range from greater than 100% to 500%.

An interior coating thickness 414*a* of the housing coating 360*a* can be measured at the interior 42 of the ATS 310. The interior coating thickness 414*a* can be greater than an exterior coating thickness 414*b*. It is contemplated that the coating thickness 414 can vary between any two locations. The thicker interior coating thickness 414*a* than the exterior coating thickness 414*b* provides a weight savings while providing the desired durability of the air flow path 42.

A stator 362 can be included in the ATS 310. The stator 362 can couple to or be formed as part of the housing 340 or the inlet housing 352. The stator 362 having a hollow stator core 410 is defined by a stator coating 360*b*. The stator core 110 (FIG. 3) can be a sacrificial mandrel, such that when it is removed, the hollow stator core 410 is formed. The stator coating 360*b* can be a shell that surrounds, encases, or otherwise encompasses the hollow stator core 410. Optionally, the hollow stator core 410 can include the support structures 422.

A stator thickness 412 can be measured across the hollow stator core 410. The stator thickness 412 can be in a range from 0.02 millimeters to 2.86 millimeters (approximately 0.001 inches to 0.09 inches). For example, the stator thickness 412 of the hollow stator core 410 can be in a range from 0.25 millimeters to 2.1 millimeters (approximately 0.01 inches to 0.08 inches). The hollow stator core 410 provides a weight savings while the support structures 422 and/or the stator coating 360*b* maintain a predetermined structural size and/or shape.

The coating thickness 414 can be in a range of 0% to 600% of the stator thickness 412 measured at the same location as the coating thickness 414. For example, the coating thickness 414 can be in a range 10%-500% of the stator thickness 412 measured at the same location as the coating thickness 414. That is, the coating thickness 414 can be less than or equal to the stator thickness 412 and in a range from 10% to 100%. Alternatively, in a different and non-limiting example, the coating thickness 414 can be greater than the stator thickness 412 and in a range from greater than 100% to 500%.

A plurality of circumferential spaced hollow vanes 368 can have a leading edge 424 and a trialing edge 426. A leading-edge thickness 414*c* can be measured extending from the leading edge 424 of the plurality of circumferential spaced hollow vanes 368. The leading-edge thickness 414*c* can be greater than a trailing edge thickness 414*d* measured at the trailing edge 426. The thicker leading-edge thickness 414*c* than the trailing edge thickness 414*d* provides a weight savings while providing the desired durability and/or structure of the air flow path 42.

A forward thickness 414*e* can be measured from a forward portion 370 of a nose 366 of the hollow stator core 410. The forward thickness 414*e* can be, by way of example, greater than an aft thickness 414*f* measured from an aft portion 372 of the nose 366. The thicker forward thickness 414*e* than the aft thickness 414*f* provides a weight savings while providing the desired durability and/or structure of the air flow path 42.

Optionally, one or more additional coatings 430 can be applied to one or more portion of the coating 360. The one or more additional coatings 430 can be made of materials similar the coating 360. It is contemplated in a different and non-limiting example, that the one or more additional coatings can include materials similar to the TBC 120 (FIG. 3).

Figure 6:
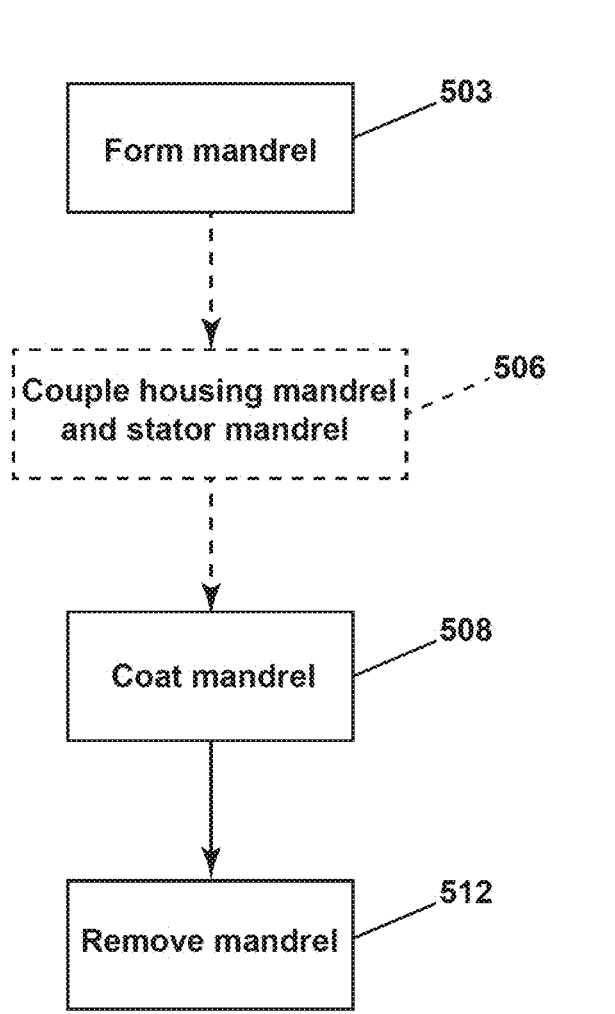
FIG. 6 is a flow chart illustrating a method of forming one or more portions of the air turbine starter of FIG. 5, in accordance with various aspects described herein.

FIG. 6 illustrates a method 500 of forming one or more portions of the ATS 310, wherein aspects of the ATS 310 are illustrated at least in FIG. 5. For example, the method 500 can be a method of forming one or more portions of the housing 340, the stator 362, or portions of the housing 340 and the stator 362. At 503, one or more sacrificial mandrels are formed. The sacrificial mandrel can be one or more parts of the housing 340, the inlet housing 352, or the stator 362, wherein, upon removal, the sacrificial mandrel forms one or more hollow cavities such as, but not limited to, the hollow housing core 400 or the hollow stator core 410.

By way of further non-limiting example, at 503, the housing core 100 (FIG. 3), the stator core 110 (FIG. 3), or the housing core 100 and the stator core 110, are formed as sacrificial mandrels. The sacrificial mandrel or sacrificial mandrels can be unitarily form (i.e., additive manufacturing), or formed separately. That is, the housing core 100 or the stator core 110 can be formed using, by way of non-limiting example, a cast mold, application of layers (i.e., additive manufacturing), machined part, of any combination therein. The housing core 100 and the stator core 110 can be formed as a single piece or as two or more pieces, where any number of pieces are contemplated. The housing core 100 or the stator core 110 can include, by way of example, one or more of acrylonitrile butadiene styrene (also known as ABS plastic), conductive waxes, or other polymers.

At 508, the sacrificial mandrel or sacrificial mandrels are surrounded by the coating 360. That is, the housing core 100, the stator core 110, or the housing core 100 and the stator core 110 receive the coating 360.

The coating 360 can be applied by electroforming. During electroforming, the coating 360 can be applied as a single layer or multiple layers. Alternatively, the coating can be applied or deposited by direct metal deposition, dip coatings, spray coating, or any known coating application process.

While described as including a metallic material such as, but not limited to titanium, nickel, chromium, or any combination of conductive metals, it is contemplated that the coating 360 can include a ceramic material.

At 512, the sacrificial mandrel is removed. The sacrificial mandrel can be removed by application of heat, chemicals, machining, or any combination therein.

Optionally, at any point during the method 500, additional layers of coating or additional components or parts can be applied to or coupled to the sacrificial mandrils, the coating 360, the stator 362, or the housing 340.

Optionally, at any point during the method 500, the stator 362 having the hollow stator core 410 defined by the stator coating 360*b* can be mounted to the inlet housing 352 having the hollow housing core 400 defined by the housing coating 360*a*.

Optionally, at any point during the method 500, a TBC coating (not shown) can be applied to one or more portions of the stator 362 or the housing 340.

Benefits of housing core or stator core made of the first material and the coating made of the second material is a weight savings. The housing core and/or the stator core can be made of a lighter material or made to be hollow. The coating that defines the housing core and/or the stator core provides the structural support and maintains or improves the desired size, shape, and durability of the component. That is, a component made from aluminum or magnesium alloys and coated with nickel cobalt phosphate is lighter than the same component made from steel, yet has similar or better strength or impact resistance. The weight savings and material strength can provide an increased strength to weight ratio.

The thickness of the coating can be controlled. That is, regions of the inlet housing and/or the stator can have a thicker or thinner coating depending on location. In other words, regions of the inlet housing and/or the stator that experience greater airflow, pressure, or would be contacted first in an impact event, can have a thicker coating than other areas of the inlet housing and/or the stator.

The stator and the inlet housing can be unitarily formed and then coated. This decreases the number of junctions in the ATS.

Electroforming, for example, can provide a coating with structural integrity such that the core can be leached; providing a weight savings. Support structures or stiffeners can span the hollow cores and are located between portions of the coating to provide additional stiffness, support, and/or rigidity.

Further aspects are provided by the subject matter of the following clauses:

An air turbine starter comprising a housing having a inlet and an outlet to define an air flow path from the inlet to the outlet, wherein the housing includes a housing core, a stator rotationally stationary relative to the housing and having a plurality of circumferentially spaced vanes extending into the air flow path, the stator comprising a stator core, and a coating applied to one or more portions of the housing defining the housing core, or the stator defining the stator core, wherein the housing core or the stator core comprise a first material having a first hardness and the coating comprises a second material having a second hardness that is greater than the first hardness.

A turbine engine comprising a fan section, a compressor section, a combustion section, and a turbine section in serial flow arrangement, and defining an engine centerline, and an air turbine starter coupled to one or more portions of the fan section or the compressor section such that the air turbine starter is located radially outward from the engine centerline, the air turbine starter comprising, a housing having an outer surface and an inner surface, the inner surface defining an interior, wherein the housing includes an inlet and an outlet to define an air flow path from the inlet to the outlet, wherein the housing includes a housing core, a stator coupled to the housing and having a plurality of circumferentially spaced vanes extending into the air flow path, the stator assembly comprising a stator core, and a coating applied to one or more portions of the housing to define a housing core or the stator to define a stator core, wherein the housing core or the stator core comprise a first material having a first hardness and the coating comprises a second material having a second hardness that is greater than the first hardness.

The turbine engine or air turbine starter of any preceding clause, further comprising a thermal barrier coating located between the coating and one of the housing core or the stator core.

The turbine engine or air turbine starter of any preceding clause, wherein the first material comprises aluminum and the second material comprises nickel cobalt phosphate (NiCoP).

The turbine engine or air turbine starter of any preceding clause, wherein the coating comprises multiple layers.

The turbine engine or air turbine starter of any preceding clause, wherein the first material has a first thermal conductivity and the second material has a second thermal conductivity, which is lesser than the first thermal conductivity.

The turbine engine or air turbine starter of any preceding clause, wherein the first material is electrically conductive.

The turbine engine or air turbine starter of any preceding clause, wherein the housing core or the stator core are electrically conductive and the coating is electroformed to surround the housing core or the stator core.

The turbine engine or air turbine starter of any preceding clause, wherein the housing includes an inlet housing that defines the inlet and the housing core, wherein the coating surrounds at least a portion of the inlet housing.

The turbine engine or air turbine starter of any preceding clause, wherein the stator core comprises a third material having a third hardness different from the first hardness of the housing core, wherein the third hardness is less than the second hardness of the coating.

The turbine engine or air turbine starter of any preceding clause, wherein the coating surrounds the stator core and the housing core.

The turbine engine or air turbine starter of any preceding clause, wherein the housing core has a housing thickness, the stator core has a stator thickness, and the coating has a coating thickness, wherein the coating thickness is in a range of 5% to 200% of the housing thickness or stator thickness.

The turbine engine or air turbine starter of any preceding clause, wherein the housing core has a housing thickness, the stator core has a stator thickness, and the coating has a coating thickness, wherein the coating thickness is in a range of 10% to 500% of the housing thickness or stator thickness.

The turbine engine or air turbine starter of any preceding clause, wherein the coating extends over at least the plurality of circumferentially spaced vanes that extend into the air flow path.

The turbine engine or air turbine starter of any preceding clause, wherein each vane of the plurality of circumferentially spaced vanes extends from a leading edge to a trailing edge.

The turbine engine or air turbine starter of any preceding clause, wherein the coating has a coating thickness measured from an inner coating surface to an outer coating surface, wherein the coating thickness at the leading edge is greater than the coating thickness at the trailing edge.

The turbine engine or air turbine starter of any preceding clause, wherein stator includes a nose from which the plurality of circumferentially spaced vanes extend into the air flow path.

The turbine engine or air turbine starter of any preceding clause, wherein the coating thickness measured at an axially forward surface of the nose is greater than the coating thickness measured at an axially aft surface of the nose.

The turbine engine or air turbine starter of any preceding clause, wherein the housing core or the stator core is a sacrificial mandrel.

The turbine engine or air turbine starter of any preceding clause, wherein the first material comprises magnesium (i.e., magnesium alloys), aluminum (i.e., aluminum alloys), zinc (i.e., zinc alloys), one or more polymers, carbon, or any combination therein and the second material comprises nickel cobalt phosphate (NiCoP).

The turbine engine or air turbine starter of any preceding clause, wherein removal of the sacrificial mandrel forms a hollow housing core or a hollow stator core, wherein support structures span the hollow housing core or a hollow stator core.

The turbine engine or air turbine starter of any preceding clause, wherein the hollow housing core has a housing thickness, the hollow stator core has a stator thickness, and the coating has a coating thickness, wherein the coating thickness is in a range of 0% to 600% of housing thickness or stator thickness.

A method of forming a portion of an air turbine starter, the method comprising forming one or more portions of a housing, a stator, or portions of a housing and a stator of the air turbine starter, wherein one or more of the housing or the stator include a first material with a first hardness, applying a thermal barrier coating to a portion of one or more of the housing or the stator, applying a coating to one or more of the housing or the stator, wherein at least part of the thermal barrier coating is between the coating and one or more of the housing or the stator, and wherein the portions of the one or more of the housing or the stator surrounded by the coating define one or more of a housing core or a stator core.

The method of any preceding clause, wherein the applying a coating includes electroforming the coating onto the one or more portions of the housing, the stator, or the housing and the stator.

The method of any preceding clause, further comprising coupling the housing and the stator.

The method of any preceding clause, further comprising removing one or more of the housing core or the stator core to define one or more of a hollow housing core or a hollow stator core.

What is claimed is:

1. An air turbine starter comprising:
   a housing having an inlet and an outlet to define an air flow path from the inlet to the outlet;
   a stator rotationally stationary relative to the housing and having a plurality of circumferentially spaced vanes extending into the air flow path; and
   a coating applied to one or more portions of both the housing and the stator, wherein the coating includes one or more portions that confront the air flow path and one or more portions that do not confront the air flow path;
   wherein the housing or the stator comprise a first material having a first hardness, and wherein the coating comprises a second material having a second hardness that is greater than the first hardness; and
   wherein the coating includes a coating thickness, and wherein the coating applied to the housing and the stator that confronts the air flow path along among both the housing and the stator is thicker than the coating that does not confront the air flow path.

2. The air turbine starter of claim 1, further comprising a thermal barrier coating located between the coating and one of the housing or the stator.

3. The air turbine starter of claim 1, wherein the first material comprises aluminum and the second material comprises nickel cobalt phosphate (NiCoP).

4. The air turbine starter of claim 1, wherein the coating comprises multiple layers.

5. The air turbine starter of claim 1, wherein the first material has a first thermal conductivity and the second material has a second thermal conductivity, which is lesser than the first thermal conductivity.

6. The air turbine starter of claim 1, wherein the first material is electrically conductive.

7. The air turbine starter of claim 6, wherein the housing or the stator are electrically conductive and the coating is electroformed to surround the housing or the stator.

8. The air turbine starter of claim 1, wherein the housing includes an inlet housing that defines the inlet, wherein the coating surrounds at least a portion of the inlet housing.

9. The air turbine starter of claim 1, wherein the housing has a housing thickness, the stator has a stator thickness, and wherein the coating thickness is in a range of 5% to 200% of the housing thickness or stator thickness.

10. The air turbine starter of claim 1, wherein the coating extends over at least the plurality of circumferentially spaced vanes that extend into the air flow path.

11. The air turbine starter of claim 10, wherein each vane of the plurality of circumferentially spaced vanes extends from a leading edge to a trailing edge.

12. The air turbine starter of claim 11, wherein the coating thickness at the leading edge is greater than the coating thickness at the trailing edge.

13. The air turbine starter of claim 12, wherein the stator includes a nose from which the plurality of circumferentially spaced vanes extend into the air flow path.

14. The air turbine starter of claim 13, wherein the coating thickness measured at an axially forward surface of the nose is greater than the coating thickness measured at an axially aft surface of the nose.

15. The air turbine starter of claim 1, wherein the housing includes a housing core and the stator includes a stator core, and wherein the housing core or the stator core is a sacrificial mandrel.

16. The air turbine starter of claim 15, wherein the first material comprises magnesium, aluminum, zinc, one or more polymers, carbon, or any combination therein and the second material comprises nickel cobalt phosphate (NiCoP).

17. The air turbine starter of claim 15, wherein removal of the sacrificial mandrel forms a hollow housing core or a hollow stator core, wherein support structures span the hollow housing core or the hollow stator core.

18. The air turbine starter of claim 17, wherein the hollow housing core has a housing thickness, the hollow stator core has a stator thickness, and wherein the coating thickness is in a range of greater than 0% and less than or equal to 600% of the housing thickness or the stator thickness.

* * * * *